United States Patent [19]

Irwin et al.

[11] 3,991,028

[45] Nov. 9, 1976

[54] HYDROLYZED POLYEPOXIDE DISPERSIONS

[75] Inventors: James Irwin, New Kensington; J. Alden Erikson, Gibsonia, both of Pa.

[73] Assignee: PPG Industries, Inc., Pittsburgh, Pa.

[22] Filed: Feb. 20, 1975

[21] Appl. No.: 551,793

Related U.S. Application Data

[62] Division of Ser. No. 61,498, Aug. 5, 1970, Pat. No. 3,891,525.

[52] U.S. Cl. .................... 260/29.4 R; 204/181; 260/29.4 UA; 260/834; 260/836; 260/837 R; 260/851; 260/856
[51] Int. Cl.² ................. C08L 61/26; C08L 63/02; C08L 63/10; C25D 13/04
[58] Field of Search ....... 260/834, 29.4 R, 29.4 UA, 260/851, 856; 204/181

[56] References Cited

UNITED STATES PATENTS

| | | | |
|---|---|---|---|
| 3,397,159 | 8/1968 | Slater et al. | 204/181 |
| 3,403,088 | 9/1968 | Hart | 204/181 |
| 3,786,113 | 1/1974 | Vassileff | 260/834 |

*Primary Examiner*—John C. Bleutge
*Assistant Examiner*—Thurman K. Page
*Attorney, Agent, or Firm*—William J. Uhl

[57] ABSTRACT

Improved electrodepositable compositions comprising a water dispersion of a hydrolyzed polyepoxide in combination with an interpolymer of a hydroxyalkyl ester, an unsaturated acid and at least one other monomer, and an amine-aldehyde resin. The use of a hydrolyzed polyepoxide provides improved properties and avoids the tendency of similar compositions containing epoxies to agglomerate.

10 Claims, No Drawings

HYDROLYZED POLYEPOXIDE DISPERSIONS

This is a division of application Ser. No. 61,498, filed Aug. 5, 1970, now U.S. Pat. No. 3,891,525.

STATE OF THE PRIOR ART

In recent years electrodeposition has received wide industrial acceptance as a method for applying protective and decorative coatings. The electrodeposition process is well-described in the art. An aqueous bath containing the coating composition is placed in contact with an electrically-conductive anode and an electrically-conductive cathode, and upon the passage of electric current (normally direct current) between the anode and the cathode while in contact with the bath containing the coating composition, an adherent film of the coating composition is deposited, usually on the anode. The process parameters used vary widely. The voltage applied may vary from as low as, for example, 1 volt to as high as, for example, 500 volts or higher. However, typically the voltage used ranges from 50 to 400 volts. The current demands are higher during the initial stages of the deposition, but tend to decrease as the deposited film insulates the conductive anode. Generally, the anode employed may be any electrically-conductive surface, such as iron, steel, aluminum, tin, zinc, copper, chromium, magnesium, galvanized steel, phosphatized steel, as well as other metals and pretreated metals.

A wide variety of electrodepositable resins are known in the industry. For example, a number of water-soluble, water-dispersible, or water-emulsifiable polycarboxylic acid resins can be electrodeposited. Some of these resins include: reaction products or adducts of a drying oil or semi-drying oil fatty acid ester with a dicarboxylic acid or anhydride; interpolymers of a hydroxyalkyl ester of an unsaturated carboxylic acid, unsaturated carboxylic acid, and at least one other ethylenically unsaturated monomer; alkyd-amine vehicles, that is, vehicles containing an alkyd resin and an amine-aldehyde resin; and mixed esters of resinous polyols. The electrodepositability of certain other materials, including certain waxes, natural and synthetic resins have been known in the art for some time.

DESCRIPTION OF THE INVENTION

Electrodeposition is, in many respects, advantageous when compared to ordinary conventional application methods; for example, electrodeposition gives uniform film thickness, coats recessed areas, and does not run, bubble or sag. However, difficulty has been experienced in obtaining electrodepositable compositions which have the properties of the more desirable conventionally applied coatings, such as hardness, impact resistance, mar and scuff resistance.

It has been known that additions of a polyepoxide to a water dispersed electrodepositable coating composition significantly improves hardness and impact resistance; however, on aging, such compositions evidence agglomeration and instability. The exact mechanism of the agglomerate reaction is not known but it is believed that the oxirane ring of the polyepoxide reacts with an acid group of the water-dispersed coating composition to form the undesired agglomerates. The resulting unstable system is readily detectable by a general decrease in film thickness of the deposited coatings and by the presence of small balls, masses or clusters of soft resinous material which has precipitated out of suspension and collected on the base or sides of the electrocoating bath.

It has now been discovered that stable coating compositions can be produced by utilizing a hydrolyzed polyepoxide in combination with an interpolymer of a hydroxyalkyl ester of an unsaturated acid and an amine-aldehyde resin.

The hydrolysis of polyepoxides is well known in the art, for example, hydrolyzed polyepoxides may be prepared by heating a dilute aqueous acid solution of a polyepoxide in solvents consisting of glycol ethers or mixtures of aromatic hydrocarbons and alkanols. See U.S. Pat. No. 3,405,093 for a more detailed description of the procedures.

The hydrolyzed polyepoxide used in this invention can be made by hydrolyzing any epoxide compound or mixture having an epoxy functionality greater than 1.0, that is, in which the average number of oxirane groups

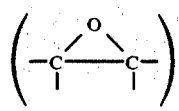

per molecule is greater than 1. The average number of oxirane groups may be a fractional number, and in general is less than 4.0. The polyepoxides comprise a relatively large class of materials and have been described in numerous patents, such as U.S. Pat. Nos. 2,467,171; 2,615,007; 2,716,123; 3,030,336; 3,053,855 and 3,075,999.

Among the hydrolyzed polyepoxides which may be used herein are the hydrolysis products of polyglycidyl ethers of polyphenols, such as Bisphenol A. These may be obtained, for example, by esterification of a polyphenol with epichlorohydrin or dichlorohydrin in the presence of an alkali. The phenolic compound may be bis(4-hydroxyphenyl)2,2-propane, 4,4'-dihydrobenzophenone, bis(4-hydroxyphenyl)1,1-ethane, bis(4-hydroxyphenyl)1,1-isobutane, bis(4-hydroxy-tertiary-butyl-phenyl)2,2-propane, bis(2-hydroxynaphthyl)methane, 1,5-dihydroxy-naphthalene, or the like. The polyphenol can also be a novolak resin or a similar polyphenol resin.

Such polyglycidyl ethers of polyphenols correspond to the average formula:

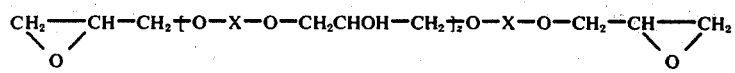

in which X represents an aromatic radical, and z represents zero, a whole or fractional small number. Similarly, suitable polyglycidyl ethers of polyhydric alcohols are those which may be derived from such aliphatic polyhydric alcohols as ethylene glycol, diethylene glycol, triethylene glycol, 1,2-propylene glycol, 1,4-butylene glycol, 1,5-pentanediol, 2,4,6-hexanetriol, glycerol, and the like. Such hydrolyzed polyepoxides provide water-dispersed, neutralized compositions of better stability, and thus are preferred in certain instances.

Also suitable are hydrolyzed polyglycidyl esters of polycarboxylic acids, which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, dicarboxylic acid, dimerized linolenic acid, and the like. Examples are diglycidyl adipate and diglycidyl phthalate, and similar esters which correspond to the formula:

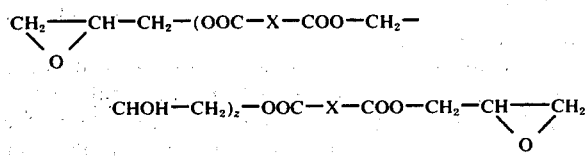

in which X represents a hydrocarbon radical, such as a phenyl or other aromatic radical, or aliphatic radical and $z$ represents a whole or fractional small number.

There may also be employed hydrolyzed polyepoxides derived from the epoxidation of an olefinically unsaturated alicyclic compound. Included are diepoxides and higher epoxides, as well as mixtures of epoxides comprising, in part, one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid.

Among the polyepoxides derived from the epoxidation of alicyclic compounds are those of the formula:

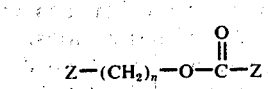

where $n$ is a small whole number, e.g., from 1 to 8, and Z is a radical of the structure:

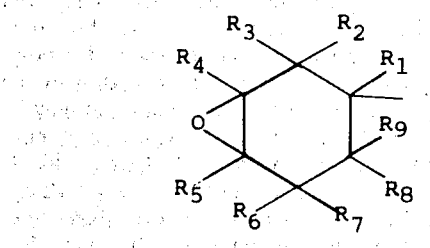

where $R_1$ through $R_9$ are hydrogen or lower alkyl groups, i.e., having up to about 8 carbon atoms. Examples of these polyepoxides are described in U.S. Pat. No. 2,716,123.

There may also be employed the corresponding diesters of the formula:

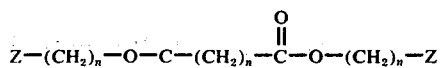

where $n$ and Z are as above. Products of this type may be produced, for example, by reducing the cyclic unsaturated aldehyde from the Diels-Alder reaction of crotonaldehyde and butadiene (or similar reactants) to the corresponding alcohol, and reacting 2 moles of this alcohol with 1 mole of sebacic acid or a similar dicarboxylic acid.

Other polyepoxides from the epoxidation of olefinically unsaturated compounds are those of the formula:

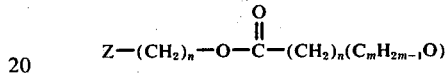

where Z and $n$ are as above and the group $(C_mH_{2m-1}O)$ is an epoxyalkyl group, preferably having from 8 to 16 carbon atoms. These compounds may be produced by the epoxidation of a 3-cyclohexenylalkyl ester of a mono-unsaturated fatty acid, for example, with peracetic acid. Examples of these compounds are disclosed in U.S. Pat. No. 2,786,066.

Higher epoxides are produced from the similar reaction of 3-cyclohexenylalkyl esters of polyunsaturated fatty acids, and these when hydrolyzed can also be employed in the invention. These include, for example, the polyepoxides of U.S. Pat. No. 2,786,067 and others having the formula:

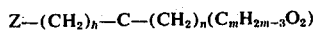

where Z and $n$ are as above.

Still other hydrolyzed polyepoxides from the epoxidation of olefinically unsaturated alicyclic compounds that may be employed are the epoxy-alicyclic ethers which correspond to the above-described epoxy-alicyclic esters. For example, these have the formula:

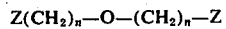

where Z and $n$ are as above.

Polyepoxides are easily hydrolyzed and can be acid or base catalyzed. A typical acid-catalyzed cleavage of the oxirane ring of Bisphenol A is set forth below for illustrative purposes.

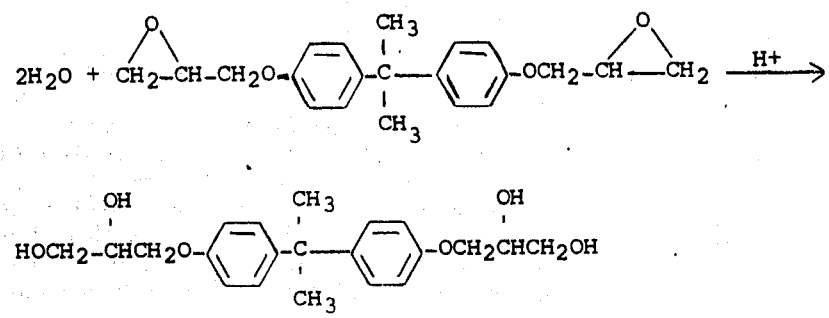

When each oxirane ring is cleaved, two functional groups are produced, so that if the reaction is with water, the product is a glycol, but the polyepoxide may also be reacted with an alcohol to produce a product that is both an ether and an alcohol (hydroxyether). However, for the purposes of this invention, it is preferred that both functional groups be hydroxyl groups.

The hydroxyalkyl ester interpolymer used in this invention unsaturated from about 1 percent to about 20 percent by weight of a hydroxyalkyl ester of acrylic acid, methacrylic acid, or other alpha, beta-ethylenically unsaturated carboxylic acid. The esters may be formed by an alkylene glycol esterified with the acid, or they can be produced by the reaction of the acid with an alkylene oxide. Interpolymerized with the hydroxyalkyl ester is from about 1 percent to about 20 percent by weight of an unsaturated carboxylic acid, and at least one other ethylenically unsaturated monomer copolymerizable with the acid and the ester.

The preferred hydroxyalkyl esters in the interpolymer are esters of acrylic acid and methacrylic acid in which the hydroxyalkyl group has up to 5 carbon atoms, such as 2-hydroxyethyl acrylate, 2-hydroxypropyl acrylate, 3-hydroxypropyl acrylate, 2-hydroxyethyl methacrylate, 2-hydroxypropyl methacrylate, 3-hydroxyethyl methacrylate, 4-hydroxybutyl methacrylate, and mixtures of such esters. Corresponding esters of other unsaturated acids, for example, ethacrylic acid, crotonic acid and similar acids up to about 6 carbon atoms, can also be employed.

In addition to esters of unsaturated monocarboxylic acids, there may be employed mono- or diesters of unsaturated dicarboxylic acids, in which at least one of the esterifying groups contains a hydroxyl group. Such esters of unsaturated dicarboxylic acids provide specific characteristics in certain compositions. Examples of such esters include:

Mono(2-hydroxyethyl)maleate
Mono(2-hydroxyethyl)fumarate
Bis(2-hydroxyethyl)maleate
Mono(2-hydroxypropyl)maleate
Bis(2-hydroxypropyl)maleate
Mono(2-hydroxyethyl)itaconate
Bis(2-hydroxyethyl)itaconate
2-Hydroxyethylbutyl maleate The unsaturated acid monomer of the interpolymer is preferably acrylic acid or methacrylic acid, although other acids of up to about 6 carbon atoms, such as the unsaturated monocarboxylic acids and dicarboxylic acids described above in connection with the esters, can also be utilized. When a monoester of a dicarboxylic acid is utilized as the hydroxyalkyl monomer, it may also be considered as all or part of the acid monomer.

The remainder of the interpolymer is made up of one or more other ethylenically unsaturated monomers copolymerizable with the ester and the acid. Any such monomer can be used; included among the monomers preferably utilized are various alkyl esters of alpha, beta-ethylenically unsaturated carboxylic acids, such as the alkyl acrylates and alkyl methacrylates, including ethyl, methyl, propyl, butyl, hexyl, ethylhexyl and lauryl acrylates and methacrylates, as well as similar esters having up to about 20 carbon atoms in the alkyl group. A vinyl aromatic hydrocarbon is also desirably employed in the interpolymer, typical examples being styrene, alpha-alkyl styrene, and vinyl toluene or the like.

Other unsaturated monomers which can be used include various monoolefinic and diolefinic hydrocarbons, halogenated monoolefinic and diolefinic hydrocarbons, other unsaturated esters of organic and inorganic acids, unsaturated nitriles, unsaturated amides, and the like. Some specific monomers which may be mentioned include ethylene, 1,3-butadiene, acrylonitrile, acrylamide, vinyl acetate, alpha-chlorostyrene, vinyl chloride, methyl crotonate, allyl chloride and similar compounds.

These interpolymers are produced using conditions and catalysts conventionally employed in making acrylic interpolymers. For example, a free radical catalyst is usually present and the polymerization temperatures are generally between about 65° and 140° C.

The hydroxyalkyl ester interpolymer used should be at least partially neutralized; that is, all or part of the acidic carboxylic groups should be neutralized in order to obtain properties desirable in the electrodeposited film. Ordinarily, at least about 10 percent of the acidic groups are neutralized. This is accomplished by reacting the acidic groups with a base, and can be carried out either before or after the interpolymer is mixed with the other components of the coating composition. Various bases can be employed for the neutralization, and it is preferred that a substantial proportion, for example, about 50 percent or more of the acidic groups be neutralized. Inorganic bases, such as sodium hydroxide, potassium hydroxide, or other metal hydroxides, can be used, as can organic bases such as ammonia or other amines. The particular base employed and the extent of neutralization depends in part upon the monomers used in the interpolymer and the components of the coating composition.

The preferred amines employed in this invention are triethylamine, dimethylethanolamine and isopropanolamine. However, in many cases, ammonia is often utilized, as are other primary and secondary amines. Among the amines that may be used are alkylamines, such as ethylamine, propylamine, dimethylamine, dibutylamine, cyclohexylamine, diisoamylamine and tripropylamine; unsaturated amines, such as allylamine; arylamines, such as aniline; aralkylamines, such as benzylamine; alkarylamine, such as m-toluidine; cyclic amines, such as morpholine and piperidine; diamine, such as hydrazine, ethylenediamine and piperazine, and other substituted amines, such as triethanolamine. In some cases, part of the neutralization is carried out with a diamine and part with another base.

The neutralization reaction is accomplished by mixing the neutralizing base with the interpolymer or the water-dispersed composition. A water solution or other solution of the base may be utilized and, if desired, moderately elevated temperatures may be employed.

In addition to the interpolymers and hydrolyzed polyepoxides as hereinabove described, another essential component of the electrodepositable compositions of this invention is an amine-aldehyde condensation product which may be added up to 50 percent by weight of an amine-aldehyde condensation product, based on weight of acrylic interpolymer and amine-aldehyde condensation product. Examples of such amine-aldehyde condensation products of melamine, urea, benzoguanamine or a similar compound, and may be water-soluble or organic solvent-soluble. Generally, the aldehyde employed is formaldehyde, although useful products can be made from other aldehydes such as acetaldehyde, crotonaldehyde, acrolein, benzaldehyde, furfural and others. Condensation products of melamine, urea or benzoguanamine are the most common and are preferred, but products of other amines and amides in which at least one amido group is present can be employed.

For example, such condensation products can be produced with triazines, diazines, triazoles, guanadines, guanamines, and alkyl- and aryl-substituted derivatives of such compounds, including alkyl-substituted and aryl-substituted cyclic ureas, and alkyl- and aryl-substituted melamines.

Examples of such compounds are: N,N'-dimethyl urea, benzyl urea, N,N'-ethylene urea, diazine diamide, formaguanamine, acetoguanamine, ammeline, 2-chloro-4,6-diamino-1,3,5-triazine 3,5-diamino triazole, 4,6-diaminopyrimidine-2,4,6-triphenyltriamino-1,3,5-triazine, and the like.

These aldehyde condensation products contain methylol groups or similar alkylol groups, depending upon the particular aldehyde employed. If desired, these methylol groups can be etherified by the reaction with an alcohol. Various alcohols are employed for this purpose, including essentially any polyhydric alcohol, although the preferred alcohols are methanol, butanol and similar lower alcohols.

The amine-aldehyde condensation products are produced in a manner well known in the art, using acidic or basic catalysts and varying conditions of time and temperature. The acetaldehyde is often employed as a solution in water or alcohol, and the condensation, polymerization and etherification reactions may be carried out either sequentially or simultaneously.

The proportion of hydrolyzed polyepoxides incorporated with the interpolymer and amine-aldehyde condensation product may be as low as 1 percent or even lower and as high as 25 percent or higher, based upon the total weight of interpolymer and amine-aldehyde resin, to produce the desired characteristics. However, the preferred range of hydrolyzed polyepoxide used in this invention is from about 5 percent to about 15 percent.

Although the compositions of the invention are water dispersions of a combination of several components, all or part of these components may be wholly or partly water-soluble, or may be in the form of discrete particles dispersed in water. The hydroxyalkyl ester interpolymer used in this invention, after neutralization as described below, is ordinarily water-soluble, at least to the extent of forming what is commonly known as a "soap solution" therein.

While the concentration of the coating components in water is not critical within relatively wide limits, a substantial part of the composition is water, and the preferred compositions for use in electrodeposition contain from 65 percent to about 99 percent water; that is, the coating components form about 1 percent to about 35 percent by weight of the over-all dispersed composition. It is desirable to use as low a concentration as will give satisfactory results, and thus compositions with from about 1 percent to about 15 percent non-volatile resin solids are typically employed.

The sequence of combining the components of this composition is ordinarily not critical; however, it is preferred that the hydroxyalkyl ester interpolymer, amine-aldehyde condensation product, hydrolyzed polyepoxide and the neutralizing agent are blended together initially and then reduced to the desired solids content by the addition of distilled or deionized water. The initial blending aids in producing a more homogeneous composition.

In formulating the coating composition, ordinary tap water may be employed. However, such water may contain a relatively high level of metals and cations which while not rendering the process inoperative, may result in variations of properties of the bath when used in electrodeposition. Problems encountered in using such tap water include chloride ion contamination, a decrease in film build, and an increase in bath conductivity. Thus in common practice, deionized water, i.e., water from which free ions have been removed by the passage through ion exchange resins, is invariably used to make up coating compositions of this invention.

The resinous compositions of the invention are readily adaptable to pigmentation by utilization of conventional pigments employed in the art. For example, iron oxide, encapsulated aluminum, lead silica chromate, carbon black, titanium dioxide, talc, barium sulfate, and the like, as well as combinations of these and similar pigments may be used. Color pigments such as cadmium red, cadmium yellow, phthalocyanine blue, phthalocyanine green, chrome yellow, toluidine red, hydrated iron oxide, and the like may be included if desired. Also generally incorporated into the pigment composition is a dispersing agent or surface-active agent. If such a surface-active agent is used, it should be the nonionic or anionic type, or a combination of these types. It is desirable to avoid the use of a cationic type.

Usually the pigment and surface-active agent, if any, are ground together in a portion of the hydroxyalkyl ester interpolymer, or alone, to make a paste and this is blended with the other components of the particular composition to produce a pigmented coating composition. Although the pigments are usually ground in the interpolymer, they may also be ground in the amine-aldehyde condensation product or in an aqueous medium which includes a dispersing agent, such as ethoxylated alkyl phenol phosphate.

Other components in the coating composition which may be used, if desirable, include, for example, wetting agents, flow agents, fungicides, anti-oxidants, and the like.

The pigment-to-binder ratios are not critical in this invention, but the preferred ratio is from about 0.2 to 1.0 to about 0.55 to 1.0, although ratios as high as 1.2 to 1.0 and even higher have been used, and it is also possible to use ratios much lower than 0.2 to 1.0, but this will depend in part upon the pigments employed and the hiding desired.

It is desirable to maintain a relatively low pH of the water-dispersed composition. It is preferable that the pH be under about 10.0, but this depends upon particular components of both the hydroxyalkyl ester interpolymer and the other resinous material, as well as the extent of the neutralization.

Set forth below are several examples of the water-dispersed coating compositions of the invention. These examples are illustrative and are not to be construed as limiting the invention. All parts and percentages are by weight unless otherwise specified.

INTERPOLYMER A

A reaction vessel was charged with 4100 parts of butyl Cellosolve, heated to reflux, and a mixture of the following monomers was added over a 3-hour period:

|  | Parts by Weight |
|---|---|
| 2-Hydroxyethyl methacrylate | 12.0 |
| Styrene | 300.0 |
| Methacrylic acid | 180.0 |
| Butyl acrylate | 708.0 |
| Cumene hydroperoxide | 12.0 |
| Di-t-butyl peroxide | 12.0 |

At the end of the above 3-hour period, a mixture of 4.5 parts of di-t-butyl peroxide in 10.0 parts butyl Cellosolve was added to the vessel and the reaction permitted to continue for 1 hour, then a second addition of di-t-butyl peroxide in butyl Cellosolve was made in the same proportions as above. Again, the reaction is permitted to continue for 1 hour at refluxing conditions and at the termination of this hour, a third and final addition of di-t-butyl peroxide in butyl Cellosolve was made and the reaction was permitted to continue for 2 additional hours.

The resin solution produced had the following characteristics:

| Non-volatile solids content | 74.4 percent |
|---|---|
| Viscosity | 90,000 centipoises |
| Acid number | 66.7 |

A white pigment paste was formulated by utilizing the above interpolymer as follows:

Paste A

|  | Parts by Weight |
|---|---|
| Interpolymer A | 2.98 |
| Dimethylethanolamine | 0.22 |
| Deionized water | 6.80 |
| Titanium dioxide | 7.97 |
| Silica flatting pigment (Silica Syloid 161) | 0.91 |
| Zinc oxide | 0.05 |

Paste A was utilized in producing a coating composition as follows:

EXAMPLE I

|  | Parts by Weight |
|---|---|
| Interpolymer A (74.4 percent solids) | 228.0 |
| Ethoxymethoxymethyl melamine* (XM-1116) | 53.4 |
| Hydrolyzed polyepoxide** (95 percent solids) | 21.3 |
| Triethylamine | 13.7 |
| Deionized water | 3089.3 |
| Paste A | 195.0 |

\* Essentially completely alkylated hexamethylol melamine, alkylated with ethyl and methyl groups in a ratio of about 60 to 40.
\*\* Produced by acid catalyzing Bisphenol A in an aqueous medium.

The above composition was electrodeposited on chromic acid treated aluminum substrata. The anodically connected aluminum substratum was immersed in an 80° F. bath containing the water-dispersed coating composition.

The immersed substratum ws subjected to 180 volts D.C. for about 60 seconds in order to obtain a dry film thickness of 1.0 mil. The substratum was baked at 350° F. for 20 minutes. The results of the above composition, when compared with a control system without a hydrolyzed polyepoxide, are summarized as follows:

|  | Substrate | Hardness | Impact (inch pounds) Direct | Reverse |
|---|---|---|---|---|
| Control | Treated aluminum | HB | 30 | 20 |
| Hydrolyzed polyepoxide system | Treated aluminum | F | 80 | 60 |

Similar improvement was shown on iron and zinc phosphatized steel panels. Although, in some instances, the impact resistance of the hydrolyzed polyepoxide-containing compositions was as high as 180 inch pounds on both direct and reverse impact.

Interpolymer B utilized in Example II was produced as follows:

INTERPOLYMER B

A reaction vessel was charged with 650.0 parts butyl Cellosolve and heated to 100° C. The following monomer mixture was added over 3.5 hours while maintaining the contents of the vessel at reflux (110°–125° C.):

|  | Parts by Weight |
|---|---|
| Methyl methacrylate | 272.0 |
| Styrene | 680.0 |
| Ethyl acrylate | 1768.0 |
| Alpha, alpha'-azobis-isobutyronitrile | 27.2 |
| Tertiary dodecyl mercaptan | 40.0 |

After the above addition, a mixture of 4.5 parts tertiary-butylperoxy isopropyl carbonate in 10.0 parts butyl Cellosolve was added to the reaction vessel. The reaction was held at refluxing conditions for 1.5 hours and then a second addition of tertiary-butylperoxy isopropyl carbonate in butyl Cellosolve was made in the same proportions as above. The reaction continued for 1 hour and at the end of this hour, a third and final addition of tertiary-butylperoxy isopropyl carbonate in butyl Cellosolve, in the same proportions as above, was made. The reaction after the final addition was permitted to continue for 2 hours.

The resin solution produced the following characteristics:

| Non-volatile solids content | 79.9 percent |
|---|---|
| Viscosity | 415,000 centipoises |
| Acid number | 51.1 |

EXAMPLE II

|  | Parts by Weight |
|---|---|
| Interpolymer B (79.9 percent solids) | 240.0 |
| Ethoxymethoxymethyl melamine* | 66.7 |
| Hydrolyzed polyepoxide* |  |

|  | Parts by Weight |
|---|---|
| (95 percent solids) | 13.4 |
| Triethylamine | 14.4 |
| Deionized water | 3070.5 |
| Paste A | 195.0 |

*As in Example I

The results obtained on treated aluminum substrata coincided with those of Example I which showed improved impact resistance and hardness. Upon the exclusion of the hydrolyzed polyepoxide from the above composition, great difficulty was experienced in producing coating compositions that would pass 40 inch pounds on impacting. However, when the hydrolyzed polyepoxide was incorporated into the coating composition, it was not unusual for these systems to be intact after being impacted with 80 inch pounds on aluminum, or 180 inch pounds when iron and zinc phosphatized steel substrata were employed. Generally, the hardness for these coating compositions increased from 0.5 to 1.5 unit in pencil hardness, but this was somewhat dependent upon the monomeric components of the interpolymer; the particular crosslinking component and the amount; and also upon the temperature and time of the bake.

Upon continued bath usage, no undesirable resinous agglomerates were observed, which has plagued many water-dispersed compositions containing polyepoxides. The stability realized by utilizing hydrolyzed polyepoxides permits continuous operation of the bath and a reduction of bath maintenance time.

Various other electrodepositable compositions such as those hereinabove described can substitute for those of the examples. The interpolymers set forth below may be substituted instead of Interpolymers A and B, as employed in Examples I and II, respectively, to produce desirable coating compositions with physical and chemical properties similar to those obtained in the hereinabove-mentioned Examples I and II.

INTERPOLYMER C

A reaction vessel was charged with 340.0 parts of butyl Cellosolve (ethylene glycol monobutyl ether) and 310.0 parts of n-butanol, and heated to reflux (about 100° C.). The following monomers were mixed and added over a 3-hour period:

|  | Parts by Weight |
|---|---|
| Methacrylic acid | 272.0 |
| Styrene | 680.0 |
| 2-Hydroxyethyl acrylate | 408.0 |
| Ethyl acrylate | 1360.0 |
| Alpha, alpha'-azobis-isobutyronitrile | 54.0 |
| Tertiery dodecyl mercaptan | 80.0 |

After the completion of addition of the above monomers, a mixture of 4.5 parts of tertiary-butylperoxy isopropyl carbonate in 10.0 parts n-butanol was added and refluxing conditions were maintained for 1 hour. At the end of this hour, a second addition of 4.5 parts of tertiary-butylperoxy isopropyl carbonate in 10.0 parts of n-butanol was made and refluxing was continued. After 1 hour, 4.5 parts of tertiary-butylperoxy isopropyl carbonate in 10.0 parts of n-butanol were again added and refluxing conditions were maintained for 2 hours.

The resin solution produced had the following characteristics:

| Non-volatile solids content | 79.8 percent |
|---|---|
| Viscosity | 265,000 centipoises |
| Acid number | 51.2 |

INTERPOLYMER D

The procedure of Interpolymer C was repeated using the following mixture of monomers:

|  | Parts by Weight |
|---|---|
| Acrylic acid | 163.0 |
| 2-Hydroxyethyl methacrylate | 520.0 |
| Methyl methacrylate | 735.0 |
| Styrene | 408.0 |
| 2-Ethylhexyl acrylate | 924.0 |
| Alpha, alpha'-azobis-isobutyronitrile | 54.0 |
| Tertiary dodecyl mercaptan | 68.0 |

The resin solution produced had the following characteristics:

| Non-volatile solids content | 78.8 percent |
|---|---|
| Viscosity | 320,000 centipoises |
| Acid number | 35.8 |

INTERPOLYMER E

A reaction vessel was charged with 920.0 parts of butyl Cellosolve and heated to 145° C.

The following monomers were mixed and added over a 3-hour period to the refluxing vessel (145°–150° C.):

|  | Parts by Weight |
|---|---|
| Methacrylic acid | 408.0 |
| Styrene | 680.0 |
| Butyl acrylate | 1360.0 |
| Methyl methacrylate | 272.0 |
| Di-t-butyl peroxide | 27.2 |
| Cumene hydroperoxide | 27.2 |

At the end of the above 3-hour period, a mixture of 4.5 parts of di-t-butyl peroxide in 10.0 parts butyl Cellosolve was added to the vessel and the reaction permitted to continue for 1 hour, then a second addition of di-t-butyl peroxide in butyl Cellosolve was made in the same proportions as above. Again, the reaction is permitted to continue for 1 hour at refluxing conditions and at the termination of this hour, a third and final addition of di-t-butyl peroxide in butyl Cellosolve was made and the reaction was permitted to continue for 2 additional hours.

The resin solution produced had the following characteristics:

| Non-volatile solids content | 74.2 percent |
|---|---|
| Viscosity | 105,000 centipoises |

| Acid number | 66.2 |
| --- | --- |

In addition to the interpolymer substitutions, other components may be replaced, for example, hexakis(methoxymethyl)melamine, N,N'-dimethyl urea, benzyl urea, and benzoguanamine, or the like, may be employed to replace ethoxymethoxymethyl melamine in the same proportions or in different amounts to produce desirable results. Isopropanolamine has been substituted for triethylamine or dimethylethanolamine where desirable.

Although the preferred hydrolyzed polyepoxides are those derived from the hydrolysis of polyglycidyl ethers made from etherification of Bisphenol A with epichlorohydrin or dichlorohydrin, other polyglycidyl ethers may be used, for example, those derived from bis(4-hydroxy-phenyl)2,2-propane, 4,4'-dihydrobenzophenone, bis(4-hydroxy-phenyl)1,1-ethane, and bis(4-hydroxy-phenyl)1,1-isobutane.

Also, polyglycidyl ethers derived from polyhydric alcohols may be employed, for example, such polyhydric alcohols may include ethylene glycol, diethylene glycol, and 1,2-propylene glycol.

Also, the pigmentary components may be readily varied to produce the desired gloss, color, texture and resistance characteristics. For example, the amount of flatting pigment may be reduced to produce a corresponding increase in gloss. Colored and inhibitive pigments are likewise readily manipulated to produce compositions having the particular characteristic properties desired.

According to the provisions of the patent statutes, there are described above the invention and what are considered to be its best embodiments. However, within the scope of the appended claims, it is to be understood that the invention can be practiced otherwise than as specifically described.

We claim:

1. An improved, heat-hardening, water-dispersed electrodepositable coating composition comprising:
   a. from about 95 percent to about 50 percent by weight, based on the total of (a) and (b) herein, of an at least partially neutralized interpolymer of from about 1 percent about 20 percent by weight of a hydroxyalkyl ester of an alpha, beta-ethylenically unsaturated carboxylic acid, from about 1 percent to about 20 percent by weight of an unsaturated acid, and at least one other copolymerizable ethylenically-unsaturated monomer;
   b. from about 5 percent to about 50 percent by weight of an amine-aldehyde condensation product; and
   c. from about 1 percent to about 25 percent by weight based on the total of (a) and (b) of hydrolyzed polyepoxide consisting essentially of a polyol obtained by hydrolysis of a polyepoxide so as to convert the oxirane rings thereof into hydroxyl groups.

2. The composition as in claim 1 wherein the said ester is a hydroxyalkyl ester of an acid of 3 to 4 carbon atoms, said ester having 2 to 3 carbon atoms in the hydroxyalkyl group.

3. The composition as in claim 1 wherein the said unsaturated carboxylic acid is a monocarboxylic acid.

4. The composition as in claim 3 wherein the said monocarboxylic acid is acrylic or methacrylic acid.

5. The composition as in claim 1 wherein the copolymerizable ethylenically-unsaturated monomer is a member of the group consisting of:
   a. styrene, alpha-methyl styrene and vinyl toluene;
   b. ethyl acrylate, butyl acrylate, methyl methacrylate, and 2-hydroxyethyl methacrylate;
   c. acrylonitrile and methacrylonitrile; and
   d. acrylic and methacrylic acid.

6. The composition as in claim 1 wherein the copolymerizable ethylenically-unsaturated monomers are 2-hydroxyethyl methacrylate, styrene, methacrylic acid, and butyl acrylate.

7. The composition as in claim 1 wherein the aminealdehyde condensation product is a condensation product of formaldehyde and a member of the group consisting of melamine, urea, and benzoguanamine.

8. The composition as in claim 1 wherein the aminealdehyde condensation product is ethoxymethoxymethyl melamine.

9. The composition as in claim 1 wherein the hydrolyzed polyepoxide is a hydrolysis product derived from a member of the group consisting of:
   a. polyglycidyl ethers of polyphenols;
   b. polyglycidyl ethers of polycarboxylic acids;
   c. polyglycidyl ethers of polyhydric alcohols; and
   d. epoxidized olefinically unsaturated alicyclic compounds.

10. The composition as in claim 1 wherein the hydrolyzed polyepoxide is derived from a polyglycidyl ether of Bisphenol A and epichlorohydrin.

* * * * *

UNITED STATES PATENT AND TRADEMARK OFFICE
CERTIFICATE OF CORRECTION

PATENT NO. : 3,991,028

DATED : November 9, 1976

INVENTOR(S) : James Irwin and J. Alden Erikson

It is certified that error appears in the above–identified patent and that said Letters Patent are hereby corrected as shown below:

Column 5, line 10, "unsaturated" should be --contains--.

Column 7, line 59, insert -- water- -- after "over-all".

Column 10, line 3, "ws" should be --was--.

Signed and Sealed this

Fifteenth Day of February 1977

[SEAL]

Attest:

RUTH C. MASON
Attesting Officer

C. MARSHALL DANN
Commissioner of Patents and Trademarks